United States Patent [19]

Szarka

[11] Patent Number: 4,514,729
[45] Date of Patent: Apr. 30, 1985

[54] ENVIRONMENTAL CONTROL SYSTEM AND METHOD

[76] Inventor: Jay R. Szarka, 11 Orchard St., Milford, N.H. 03055

[21] Appl. No.: 408,255

[22] Filed: Aug. 16, 1982

[51] Int. Cl.³ .......................... H04Q 9/00; G08B 1/08
[52] U.S. Cl. ................................ 340/825.06; 246/47; 340/566; 340/552; 367/93
[58] Field of Search ...................... 340/825.06, 825.22, 340/825.3, 552, 566, 505, 825.54; 367/94, 93, 197; 236/51, 47

[56] References Cited

U.S. PATENT DOCUMENTS

| | | | |
|---|---|---|---|
| 3,866,198 | 2/1975 | Cohen | 367/94 |
| 4,090,248 | 5/1978 | Swanson et al. | 340/825.06 |
| 4,101,886 | 7/1978 | Grimes et al. | 367/197 |
| 4,284,126 | 8/1981 | Dawson | 340/825.22 |
| 4,354,241 | 10/1982 | Barello | 340/825.06 |
| 4,375,637 | 3/1983 | Desjardins | 340/825.06 |
| 4,410,883 | 10/1983 | Swiston, Sr. | 340/505 |

*Primary Examiner*—Donald J. Yusko
*Attorney, Agent, or Firm*—Pearson & Pearson

[57] ABSTRACT

An environmental control system includes sensors in a room for sensing the environment and a sensor which may be a sound sensor, for detecting the presence or absence of a person in the room. With the aid of a digital computer, the presence or absence of a person in the room as determined by the sound sensor enables the computer to control the environment and also to actuate an alarm when a presence is sensed during an unauthorized time period. The system is applicable to one or more rooms.

7 Claims, 3 Drawing Figures

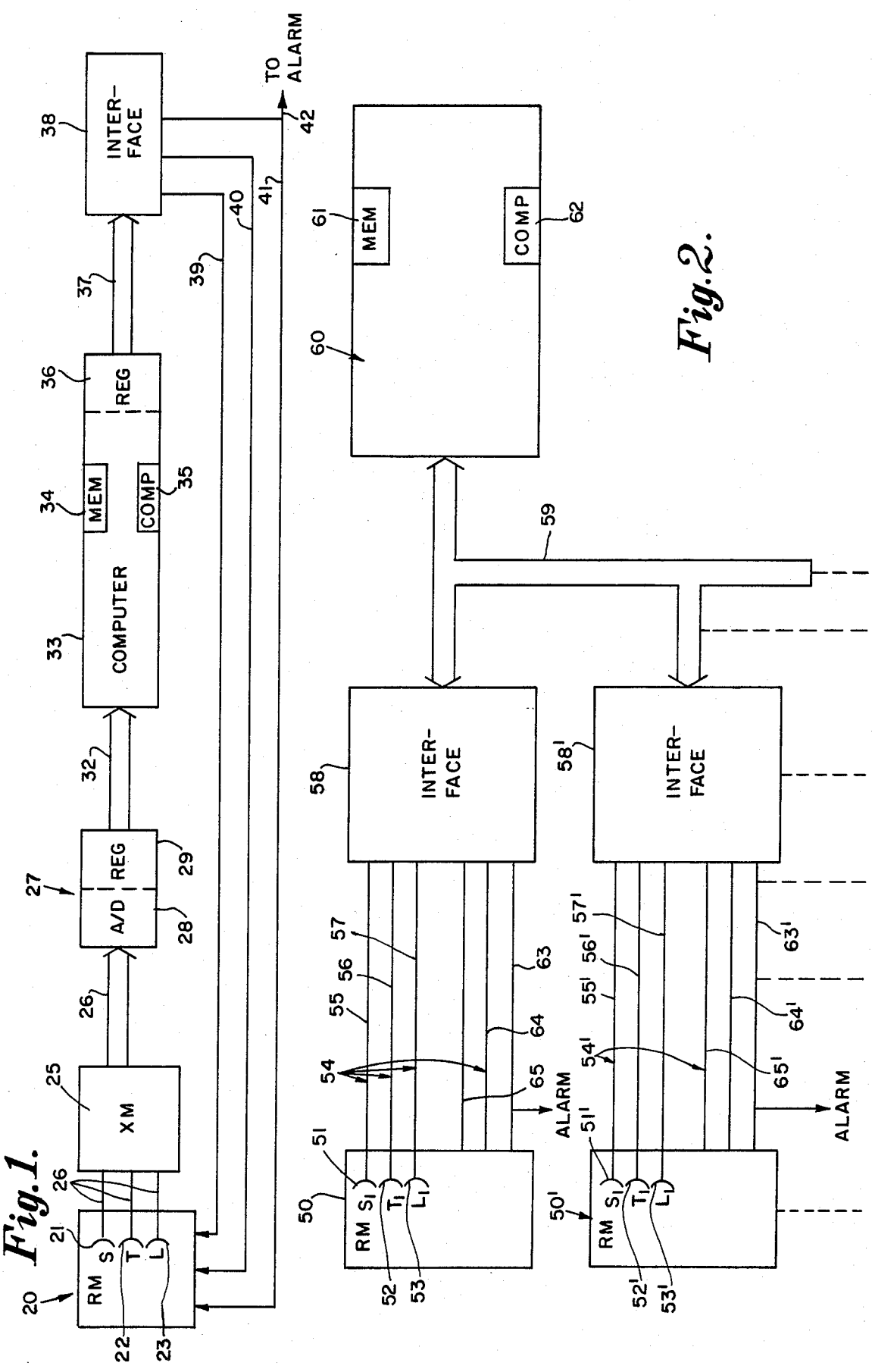

ENVIRONMENTAL CONTROL SYSTEM AND METHOD

BACKGROUND OF THE INVENTION

The present invention relates to environmental control systems, and more particularly to systems for controlling the environmental parameters of one or more rooms.

Many methods and systems have been employed heretofore to control the various environmental factors in a room. For example, U.S. Pat. No. 3,011,708 to Joerren et al, Dec. 6, 1961 for Control Network For Air Conditioning Units, describes a system for increasing or decreasing the air-conditioning supplied to a large room or chamber in accordance with the response to a radiated supersonic signal which gives an indication of the number of people in the chamber. The air-conditioning is controlled in accordance with the acoustical response to the generated supersonic signal.

My U.S. Pat. No. 4,223,831, Sept. 23, 1980, for Sound Activated Temperature Control System teaches how the temperature of an area may be controlled by the detection of a sound sensor of the presence or absence of personnel in a room.

U.S. Pat. No. 3,212,710 to Nilles Oct. 19, 1965, for Day-Night Setback Control For Thermostat Systems uses a temperature sensor and a pneumatic system. Pneumatic switches switch control to a day or night thermostat, and latches up to keep control with the day or night setting, as required. U.S. Pat. No. 3,352,490 to Dalzell et al for Automatic Set-Point Control For Thermostats In Room Heating Systems Nov. 14, 1967 has a set-back control that responds to the light available to a sensor, and thus resets the temperature control at different levels for night and day time or when a light is lit in the room. U.S. Pat. No. 3,974,426 to Gingras for In-line Energization and De-energization of an external load in service with an External Source of Electricity in Response to Externally Sensed Parameters describes a control system in which sensors sense temperature and light, to override an existing furnace thermostat switch during the day and other times when the room is lighted, and returns control to the thermostat switch, for example, to lower temperatures, during the night, when the lights in the room have been extinguished.

U.S. Pat. No. 4,022,271 to Monahan, May 10, 1977, for Electronic Temperature Controller and Switching Device describes a system in which a timer places one thermostat in control during part of the twenty four hour day, and another at another period during the day. U.S. Pat. No. 4,123,796 to Shih Oct. 31, 1978 for Controller For Environmental Conditioning Apparatus describes a system using a single bus and addressing so that any selected one of several receiving units may control the set point for the parameter to be controlled and return a signal by the bus to indicate compliance with the command; the system being under control of what is called a universal asynchronous receiver-transmitter and associated equipment. Thus, this system proposed to control the parameter for several rooms or stations.

U.S. Pat. No. 4,217,646 to Caltagirone et al, Aug. 12, 1980, for Automatic Control System For A Building describes a system in which a central control computer sets temperature and other parameters for different zones, for example, floors of a building. In this system a burst of high frequency control signals from the computer identifies by frequency the zone to which the control signal is directed and the duration of the signal identifies the function or parameter to be controlled. Data stored in the computer programs the timing of the energy devices in the building which affect the parameters to be controlled, and the selected parameter may be overridden manually. Further, an anticipation may be programmed to allow an outdoor thermometer to affect the program so that the needs of the building and zones may be anticipated depending upon the weather.

U.S. Pat. No. 4,264,960 to Gurr Apr. 28, 1981 for System For Controlling Power Distribution To Customer Loads described a system in which a central computer by two-way communication commands substation computers which in turn control loads among customers. When power loads exceed certain pre-programmed levels, peak load shaving and load deferral are effected.

Further, U.S. Pat. No. 3,613,092 to Reynolds et al, Oct. 12, 1971 is a system for generating audio signals and detecting the difference in signals when an intruder is present in a room, and when no intruder is present, and actuating an alarm in response to the detected presence. Also known is a sound-responsive means for turning on a light switch when a person enters a room in response to a clap of the hands, a snap of the fingers, or like sharp sound. Such systems are advertised in current periodicals as novelties.

SUMMARY OF THE INVENTION

According to the present invention, the environmental parameters are sensed as is also the presence or absence of a person in the room. The sensed information is compared with information stored in a digital computer and the parameters are controlled in accordance with the comparison, and if the presence is during an unauthorized time period an alarm is actuated. The parameters of one or more rooms may be controlled accordingly.

BRIEF DESCRIPTION OF THE DRAWING

The various objects, advantages, and novel features of the invention will be more fully apparent from a reading of the following detailed description when read in connection with the accompanying drawing, in which like reference numerals refer to like parts, and in which:

FIG. 1 is a block schematic diagram of one embodiment of the invention;

FIG. 2 is a schematic block diagram of another embodiment of the invention; and

DESCRIPTION OF A PREFERRED EMBODIMENT

Figure 3:
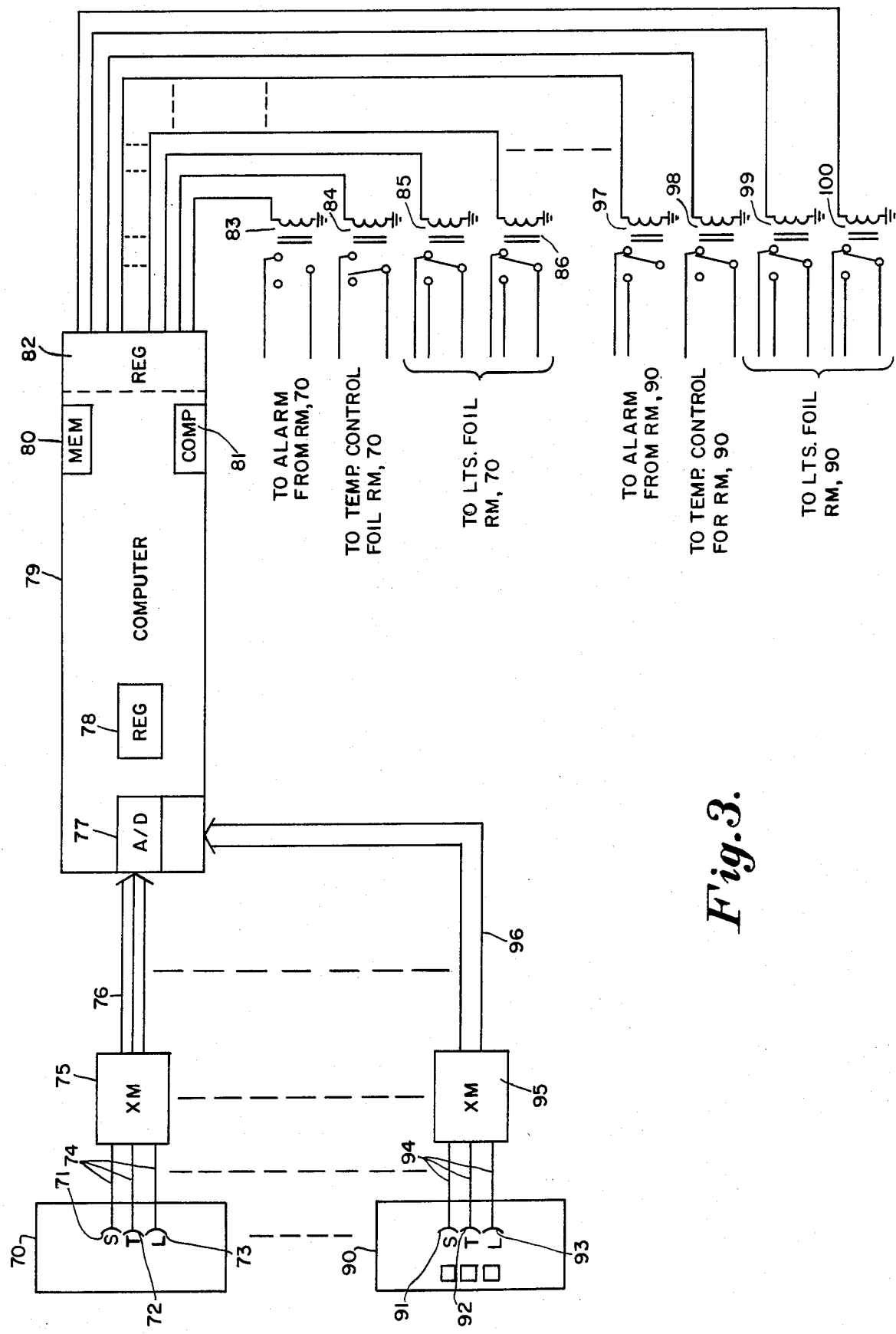
FIG. 3 is a schematic block diagram of still another embodiment of the invention.

Referring to FIG. 1, a room 20 has within it a sound sensor 21, (also indicated S), a temperature sensor 22 (also indicated T) and a light sensor 23 (also indicated L). The sensors are indicated conventionally by dishes. The sound sensor 21 is sufficiently sensitive and of a type to detect the presence or absence of a person from the sounds he or she makes as described in my above-mentioned U.S. Pat. No. 4,223,831. The sensor may sense for sound frequency components within or without the audible range. If desired, the sensors may be of the type which sets up a supersonic field which, when disturbed, discloses the presence of one or more persons in a room. A transmitter 25 (which may comprise amplifiers or be simply wires) is illustrated which serves for transmitting the detected signals from the sensors 21, 22 and 23, through cables 26 to an interface 27 for a computer 33. The interface 27 may comprise an analog to digital (A/D) converter 28 and a register 29 which is suitably connected to the computer 33 by a cable or the like 32. The interface 27 may indeed be a part of the computer 33. The computer has a memory 34, a comparator 35, and an output register 36. The output from the register 36 may be communicated by any suitable means such as cable 37 to an interface 38. The interface 38 in turn controls the temperature and light levels of the room 20, by controlling the actuation of air conditioning mechanism or heat flow, and the position of one or more light switches, in accordance with the readings from the output register 36, via output lines 39 and 40 for light and temperature, and line 41 for an alarm. The interface 38 may control the flow via line 40, of heated air, or if a hot water system is employed, the flow of hot water, or the use of a refrigerant, or the like. Other controlled environmental parameters (not illustrated) may include humidity, for example, and fresh air flow. Line 39 may control actuation of one or more light switches (not shown).

In the memory 34 may be stored desired permissable temperatures, and light levels corresponding to various time ranges which may include, not only the times within the twenty-four hour periods of a day, but also times related to week-ends and holidays. If desired to control additional parameters the desired ranges for these during various hours and dates are also stored in memory. Further, the ranges are different depending upon whether the presence or absence of a person in the room is authorized. Thus, if the presence is authorized in a daytime period, the temperature may be higher when a person is present than in the absence of a person. But, if a person's presence is sensed during an unauthorized period, an alarm is actuated, via line 41 in the room and via line 42 outside the room. Thus, the sensor 21 for the presence or absence of a body is used to perform two functions.

In operation, the various parameters are sensed by the sensors and transmitted through the interface 27 to the computer 33. The computer has an internal time clock (not shown) which carries the real or assessed time. The stored range of parameters and the authorized presence or absence of a person are recalled from memory within the computer corresponding to the assessed time, and compared with the sensed parameters as transmitted to the computer and also the sensed presence or absence of a person in the room. The parameters are controlled in accordance with the comparison and with the presence or absence of personnel during an authorized, or unauthorized time, and if during an unauthorized time an alarm is actuated. If during an authorized time, the parameters may be controlled, for example, the room temperature raised (in winter) or lowered (in summer). A different range is specified during the authorized presence or absence of a person in the room 20.

Another embodiment of the invention is illustrated in schematic block form in FIG. 2 in which a room 50 has sensors 51, 52, and 53 for sound, temperature, and light respectively. The signals from the sensors 51, 52, and 53 are conveyed by lines 54, 55 and 56 respectively via a cable 54 to a computer interface 55. The cable 54 also includes lines 63 for temperature control, 64 for light control, and 65 for an alarm either in the room or elsewhere or both, as indicated. A second room 50' has corresponding sensors and controls indicated by like numerals bearing a prime. There may be other rooms with similar controls and sensors. From interfaces 58, 58' etc. a common multi-line cable 59 extends to a computer 60 which has a memory 61 and a comparator 62. Common lines in the cable 59 extend to each interface 58, 58', etc. Each line of the cable carries a single bit or signal. One of the lines may carry a timing signal.

In operation, the computer 60 may be of a type manufactured by Digital Equipment Corporation and perhaps others. The various interface elements 58, 58', etc. are individually addressed to request the information currently stored in each interface, as by a register, with respect to the information received from the sensors, which may be converted in the interface units from analog to digital information and stored in digital form.

The memory stores information relating to the desired status of the sensors at desired times, and additionally information as to when a person may be permitted in each individual room. For example, it may not be permissible for a person to be in room 50 between 6:00 p.m. and 8:00 a.m. weekdays and holidays. In the comparator 62 the status of the register reflecting whether a person is, or is not present in room 50 is compared with the information thus stored in the memory 61. If the comparison shows a person present at an unauthorized time, the alarm is actuated by sending a suitably coded message via the lines 59 to the interface 58, individual to the room 50, and thereby cause actuation of the alarm or alarms for that room. Furthermore, in the time period between the hours indicated above, the sensed temperature level may be read and compared with the stored range of permissible temperature levels and the temperature control for that individual room actuated or not, in accordance with the comparison. Between the hours of 8:00 a.m. and 6:00 p.m. the permissible range of temperatures in the room is dependent upon the presence or absence of a person in the room as determined by the sensor S for that room. If a person is present, the stored permissible temperature range may be between 66° and 68° whereas in the absence of a person the permissible range may be between 54° and 56°. The determination of which of the temperature ranges is pertinent and is recalled from memory 61 is readily accomplished by a simple logic step depending on whether a person is present or absent as is apparent.

As is known, the computer may address each of the interfaces or stations in turn, or at desired times, and actuate any desired response equipment connected to the interface unit via lines 63 and 64 to control temperature and light for room 50, or 63' and 64' for room 50', etc.

Upon the sound sensor S sensing and transmitting a signal recognizing the presence of a person in the room 50, and if within the permitted hours, the computer receiving this information may cause the light to be turned on by sending an appropriate signal back to the interface 58, and thence via line 64 to switch on the lights, and also switch them off when the sensor signals the absence of anyone in the room 50. The computer may cause a full complement of lights to be turned on when a person is present during unauthorized periods, or all off, depending on the program, and the stored information. Accordingly, the computer may exercise a total control of the parameters of the environment in the room 50, or as much as is desired, depending upon the presence or absence of a person in a room, and the assessed time, and raise an alarm if needed.

Referring to FIG. 3, a room 70 has within it a sound sensor 71, a temperature sensor 72, and a light sensor 73. The sensors transmit signals via a cable 74 to a transmitter 75, which may be similar to those heretofore described, and from the transmitter 75 signals are sent via a cable 76 to an analog to digital converter 77 and stored temporarily in a register 78. The register 78 may be sufficiently large to record for several analog to digital converters carrying signals from other rooms, such as 90, which has sensors for sound, temperature and light 91, 92, and 93 respectively, an associated transmitter 95, and a cable 96. Other similar units are indicated schematically by the dotted lines in FIG. 3 between those just described.

The computer has an integral memory 80, a comparator 81, and an output register 82. Normally the programmer will designate those registers of the computer to serve as the output registers 82 and as the input registers 78. In some instances he may prefer to use one register shared sequentially for input or a different register for each room.

From the output register 82 information is carried by respective output lines to relays 83, 84, 85, and 86 for room 70 respectively actuating when suitably excited an alarm, temperature control, and lights for room 70. Similarly, outputs are applied to excite or not excite relays 97, 98, 99 and 100 for alarm, temperature control, and lights for room 90, from register 82, in accordance with the status of register 82. As indicated there may be other relays for the other rooms.

The operation of this embodiment is similar to that described for the other two embodiments. During an unauthorized period of time, entry of a person in the room is sensed by the sensor 71, the signal is passed to the computer, which thereupon actuates relay 83 with a current pulse through the winding to the ground, conventionally indicated, causing an alarm bell, light, or other alarm. If the presence of a person is sensed during authorized periods of time, the temperature relay is actuated, for example to actuate the air-conditioning or heating systems, as required. The system may be readily modified so that one or more relays act to set a set-point heat or air-conditioning control to the proper setting.

The relays 85 and 86 are actuated to control the lights, and are shown as single pole double throw relays. In relays 85 and 86, one setting may, for example, in response to the presence of a signal showing someone is present in the room be actuated to connect one set of contacts for certain lights, and in the absence of a person make the other set of contacts to connect a more economical set of lights, such as night lights.

The computer programming may be developed by following certain steps, although not necessarily in sequence. First is there a person present, i.e., is the room occupied or unoccupied? The assessed time is determined internally of the computer. The set parameters withdrawn from memory depend upon the answer to the occupancy question and the assessed time. If occupancy is permitted in accordance with the withdrawn information, the temperature and other parameters are compared and the parameters controlled accordingly. If occupancy is not permitted, an alarm is sounded and the parameters may or may not be controlled to a different value, but will correspond to those permitted levels in the absence of permitted occupancy. The computer may control the set-point of temperature or other parameters, or as is preferable, control the range itself by comparing the sensed parameter with the desired range. Alternatively, the set-points may be controlled by the computer. For example, one set-point for temperature may be used during unauthorized periods and a different set-point during authorized periods.

From the foregoing, it is apparent that the sound or occupancy sensor serves a function beyond that of signalling an alarm condition. It is also used as part of the control for the ambience or environment of the room or chamber in which it is installed by comparison of the occupancy and the condition of the environment, as well as being used to cause the signal for an alarm condition.

I claim:

1. A system for controlling the environment of one or more rooms comprising:
    a sensor for each room for sensing the presence or absence of a person in the room;
    means for sensing environmental parameters including temperature for each room;
    means for transmitting the sensed presence or absence and the parameters as signals;
    a digital computer responsive to the transmitted signals, and having a memory;
    information stored in the memory establishing upper and lower sensor signal limits for the temperature and time interval signals for said limits and for the authorized and unauthorized presence or absence in the room;
    said computer comprising means for comparing the received temperature signals with the stored upper and lower sensor limit signals and with the authorized time interval signal and the presence or absence signals with the time interval signals; and
    means for controlling the temperature to one limit during authorized time intervals and to the other limit during unauthorized time intervals in response to the temperature comparisons in each room and for actuating an alarm in response to a sensed presence of a person during an established unauthorized presence time interval.

2. A system as claimed in claim 1, said environmental parameters comprising light, said sensors comprising a light sensor for each room.

3. A system as claimed in claim 1, the personnel presence sensor comprising a sound sensor.

4. A system as claimed in claim 1, further including means for assessing current time, and means for comparing the assessed time with the stored time information.

5. A method for controlling an alarm and the environmental parameters of one or more rooms comprising the steps of:
    sensing the environmental parameters including temperature in each room;
    storing in a memory information corresponding to selected stored time periods: (1) temperature limits during authorized and unauthorized time intervals and (2) the presence or absence of a person during authorized and unauthorized time intervals for each room;
    comparing the sensed temperature and the sensed presence or absence of a person in each room respectively with the stored information and with the assessed current time;
    controlling the temperature in each room in accordance with the comparison of sensed temperature and stored temperature and with a comparison of current time and the stored time intervals and controlling an alarm in response to the presence signal during an unauthorized interval.

6. A method as claimed in claim 5, the parameters including light.

7. A method as claimed in claim 5, said method of sensing the presence or absence of a person in each room comprising a sound sensor.

* * * * *